United States Patent
Bulpett et al.

(10) Patent No.: US 8,309,639 B2
(45) Date of Patent: *Nov. 13, 2012

(54) RUBBER COMPOSITIONS COMPRISING BENZOQUINONES AND THE USE THEREOF IN GOLF BALLS

(75) Inventors: David A. Bulpett, Boston, MA (US); Brian Comeau, Berkley, MA (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 414 days.

This patent is subject to a terminal disclaimer.

(21) Appl. No.: 12/574,471

(22) Filed: Oct. 6, 2009

(65) Prior Publication Data

US 2010/0022329 A1 Jan. 28, 2010

Related U.S. Application Data

(63) Continuation of application No. 11/370,733, filed on Mar. 7, 2006, now abandoned.

(51) Int. Cl.
*A63B 37/06* (2006.01)
*A63B 37/00* (2006.01)
*C08K 5/08* (2006.01)

(52) U.S. Cl. ........ 524/358; 525/257; 525/274; 473/317; 473/374; 473/377

(58) Field of Classification Search .................. None
See application file for complete search history.

(56) References Cited

U.S. PATENT DOCUMENTS

| | | |
|---|---|---|
| 4,974,852 A | 12/1990 | Hiraoka et al. |
| 6,180,722 B1 | 1/2001 | Dalton et al. |
| 6,339,119 B1 | 1/2002 | Ladd et al. |
| 6,488,597 B2 | 12/2002 | Iwami et al. |
| 6,575,850 B1 | 6/2003 | Iwami et al. |
| 6,608,127 B1 | 8/2003 | Kato et al. |
| 6,750,281 B2 | 6/2004 | Hirau et al. |
| 6,767,940 B2 | 7/2004 | Voorheis et al. |
| 6,864,315 B1 | 3/2005 | Hakuta et al. |
| 6,878,075 B2 | 4/2005 | Kim |
| 6,919,393 B2 | 7/2005 | Mano et al. |
| 6,956,128 B2 | 10/2005 | Higuchi et al. |
| 8,030,387 B2 * | 10/2011 | Comeau et al. ............... 524/358 |
| 2002/0052253 A1 | 5/2002 | Fushihara et al. |
| 2004/0019138 A1 | 1/2004 | Voorheis et al. |
| 2004/0059062 A1 | 3/2004 | Kim |
| 2004/0152540 A1 | 8/2004 | Fushihara |
| 2004/0180733 A1 | 9/2004 | Kim |
| 2004/0214661 A1 | 10/2004 | Sullivan |
| 2004/0219994 A1 | 11/2004 | Sullivan |
| 2004/0219995 A1 | 11/2004 | Sullivan |
| 2004/0242802 A1 | 12/2004 | Voorheis et al. |
| 2007/0213144 A1 | 9/2007 | Comeau et al. |
| 2007/0213440 A1 | 9/2007 | Goguen et al. |
| 2007/0213441 A1 | 9/2007 | Comeau et al. |
| 2008/0274828 A1 | 11/2008 | Comeau et al. |
| 2008/0274833 A1 | 11/2008 | Comeau et al. |

FOREIGN PATENT DOCUMENTS

| JP | 05262917 | * 10/1993 |
|---|---|---|
| JP | 06080827 | * 3/1994 |

* cited by examiner

*Primary Examiner* — David Buttner

(74) *Attorney, Agent, or Firm* — Mandi B. Milbank

(57) ABSTRACT

The present invention is directed to a golf ball having at least one layer formed from a rubber composition comprising a base rubber, at least 0.05 parts by weight of a free radical initiator, per 100 parts of the base rubber, and at least 0.1 parts by weight of a benzoquinone, per 100 parts of the base rubber. The rubber composition may be present in any one or more of a core layer, a cover layer, or an intermediate layer.

8 Claims, No Drawings

RUBBER COMPOSITIONS COMPRISING BENZOQUINONES AND THE USE THEREOF IN GOLF BALLS

CROSS REFERENCE TO RELATED APPLICATIONS

This application is a continuation of U.S. patent application Ser. No. 11/370,733, filed Mar. 7, 2006 now abandoned, the entire disclosure of which is hereby incorporated herein by reference.

FIELD OF THE INVENTION

The present invention is directed to rubber compositions comprising a base rubber, at least 0.05 parts by weight of a free radical initiator, per 100 parts of the base rubber, and at least 0.10 parts by weight of a benzoquinone, per 100 parts of the base rubber. The present invention is also directed to the use of such compositions in golf equipment.

BACKGROUND OF THE INVENTION

Benzoquinones

The use of benzoquinones in rubber-based golf ball compositions is known. For example, U.S. Pat. No. 6,339,119 to Ladd et al. discloses a golf ball containing a cover layer and a core layer, where the core layer is molded from a scorch retarding composition comprising a scorch retarding peroxide, an elastomeric polymer, and a crosslinking agent. The scorch retarding peroxide typically contains a free radical scavenger selected from the group consisting of benzoquinones, hydroquinones, phenols, benzaldehydes, cyclohexadiene-1-ones, and mixtures thereof. The amount of the free radical scavenger in the scorch retarding peroxide is preferably from about 0.01 parts to about 2 parts per 100 parts of the peroxide by weight.

U.S. Pat. No. 6,767,940 to Voorheis et al. is directed to a golf ball having a core and cover, particularly to a golf ball core formed from a composition including an elastomeric polymer, a free radical initiator, and at least one stable free radical. The composition can further include one or more free radical scavengers and scorch retarders to increase the scorch time of the elastomeric polymer. Suitable free radical scavengers include benzoquinones; hydroquinones; phenols; benzaldehydes; cyclohexadiene-1-ones; and mixtures thereof.

Additional background references include U.S. Pat. No. 6,919,393 to Mano et al., U.S. Pat. No. 6,956,128 to Higuchi et al., U.S. Patent Application Publication No. 2002/0052253 to Fushihara et al., and U.S. Pat. No. 6,488,597 to Iwami et al.

Resilient Cores

The primary source of resilience, as measured by coefficient of restitution ("COR"), in commercially available golf balls is polybutadiene rubber, which is generally used to form all or part of the core. It is known that the resilience of a golf ball core, at a given compression, may be increased by forming a core layer from a rubber composition comprising an organosulfur compound. However, organosulfur compounds can be expensive and can cause processing difficulties.

Thus, a desire remains in the golf ball industry for novel rubber compositions having high resilience at a given compression. The present invention provides such compositions and their use in a variety of golf ball core, cover, and intermediate layers.

SUMMARY OF THE INVENTION

In one embodiment, the present invention is directed to a golf ball comprising a core and a cover, the core having at least one layer formed from a rubber composition comprising a base rubber, a free radical initiator, and a benzoquinone. The free radical initiator is present in the rubber composition in an amount of at least 0.05 parts by weight per 100 parts of the base rubber, and the benzoquinone is present in the rubber composition in an amount of at least 0.15 parts by weight per 100 parts of the base rubber.

In another embodiment, the present invention is directed to a golf ball comprising a core and a cover, the core having at least one layer formed from a rubber composition comprising a baser rubber, a free radical initiator, and a benzoquinone. The free radical initiator is present in the rubber composition in an amount of at least 0.05 parts by weight per 100 parts of the base rubber and the benzoquinone is present in the rubber composition in an amount of at least 0.1 parts by weight per 100 parts of the base rubber. The benzoquinone is selected from compounds represented by the following formula, and hydrates thereof:

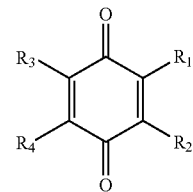

wherein each $R_1$, $R_2$, $R_3$, and $R_4$ is independently selected from the group consisting of: a metal salt of a carboxyl group (e.g., $-COO^-M^+$), an acetate group ($-CH_2COOH$) and esters thereof ($-CH_2COOR$), a hydroxy group ($-OH$), a metal salt of a hydroxy group (e.g., $-O^-M^+$), an amino group ($-NH_2$), a nitro group ($-NO_2$), an aryl group (e.g., phenyl, tolyl, etc.), an aryloxy group (e.g., phenoxy, etc.), an arylalkyl group [e.g., cumyl ($-C(CH_3)_2$phenyl); benzyl ($-CH_2$phenyl)], a nitroso group ($-NO$), an acetamido group ($-NHCOCH_3$), and a vinyl group ($-CH=CH_2$).

In another embodiment, the present invention is directed to a golf ball comprising a core and a cover, the core having at least one layer formed from a rubber composition comprising a base rubber, a free radical initiator, a benzoquinone, and substantially free of organosulfur compounds. The free radical initiator is present in the rubber composition in an amount of at least 0.05 parts by weight per 100 parts of the base rubber, the benzoquinone is present in the rubber composition in an amount of at least 0.15 parts by weight per 100 parts of the base rubber, and a ratio of the amount of the benzoquinone present in the rubber composition to the amount of free radical initiator present in the rubber composition is from 0.25 to 2. The benzoquinone is selected from compounds represented by the following formula, and hydrates thereof:

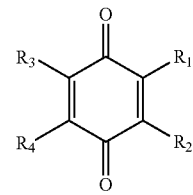

wherein each $R_1$, $R_2$, $R_3$, and $R_4$ is independently selected from the group consisting of hydrogen, a halogen group (F, Cl, Br, I), an alkyl group, a carboxyl group (—COOH) and metal salts thereof (e.g., —COO$^-$M$^+$) and esters thereof (—COOR), an acetate group (—CH$_2$COOH) and esters thereof (—CH$_2$COOR), a formyl group (—CHO), an acyl group (—COR), an acetyl group (—COCH$_3$), a halogenated carbonyl group (—COX), a sulfo group (—SO$_3$H) and esters thereof (—SO$_3$R), a halogenated sulfonyl group (—SO$_2$X), a sulfino group (—SO$_2$H), an alkylsulfinyl group (—SOR), a carbamoyl group (—CONH$_2$), a halogenated alkyl group, a cyano group (—CN), an alkoxy group (—OR), a hydroxy group (—OH) and metal salts thereof (e.g., —O$^-$M$^+$), an amino group (—NH$_2$), a nitro group (—NO$_2$), an aryl group (e.g., phenyl, tolyl, etc.), an aryloxy group (e.g., phenoxy, etc.), an arylalkyl group [e.g., cumyl (—C(CH$_3$)$_2$phenyl); benzyl (—CH$_2$phenyl)], a nitroso group (—NO), an acetamido group (—NHCOCH$_3$), and a vinyl group (—CH=CH$_2$).

DETAILED DESCRIPTION OF THE INVENTION

Golf balls of the present invention include one-piece, two-piece (i.e., solid core and a cover), multi-layer (i.e., solid core of one or more layers and/or a cover of one or more layers), and wound golf balls having a variety of core structures, intermediate layers, covers, and coatings. Golf ball cores may consist of a single, unitary layer, comprising the entire core from the center of the core to its outer periphery, or they may consist of a center surrounded by at least one outer core layer. The center, innermost portion of the core is preferably solid, but may be hollow or liquid-, gel-, or gas-filled. The outer core layer may be solid, or it may be a wound layer formed of a tensioned elastomeric material. Golf ball covers may also contain one or more layers, such as a double cover having an inner and outer cover layer. Optionally, additional layers may be disposed between the core and cover.

Golf balls of the present invention have at least one layer which is formed from a rubber composition of the present invention. In a particular embodiment, the rubber composition of the present invention is present in at least one core layer of a two-piece or multi-layer golf ball.

Rubber Composition

Rubber compositions of the present invention comprise a base rubber, at least one free radical initiator, and at least one free radical scavenger.

The base rubber is selected from natural and synthetic rubbers and mixtures thereof, including, but not limited to, polybutadiene; mixtures of two or more polybutadienes; styrene-butadiene; mixtures of two or more polybutadienes and styrene-butadiene; and mixtures of polybutadiene(s) with one or more additional rubbers selected from natural rubber, polyisoprene rubber, ethylene propylene rubber, ethylene propylene diene rubber, styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, polystyrene elastomers, polyethylene elastomers, polyurethane elastomers, polyurea elastomers, metallocene-catalyzed elastomers, and plastomers. When the base rubber is a mixture of polybutadiene and at least one additional rubber, the amount of polybutadiene in the mixture is preferably at least 40 wt %, based on the total weight of the mixture. In a particular embodiment, the base rubber is polybutadiene. Suitable examples of commercially available polybutadienes include, but are not limited to, Buna CB 23, commercially available from LANXESS Corporation; SE BR-1220, commercially available from The Dow Chemical Company; Europrene® NEOCIS® BR 40 and BR 60, commercially available from Polimeri Europa; UBEPOL-BR® rubbers, commercially available from UBE Industries, Ltd.; and BR 01 commercially available from Japan Synthetic Rubber Co., Ltd.

The free radical initiator is selected from organic peroxides, high energy radiation sources capable of generating free radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free radical initiators are generally present in the rubber composition in an amount of at least 0.05 parts by weight per 100 parts of the base rubber, or an amount within the range having a lower limit of 0.05 parts or 0.1 parts or 1 part or 1.25 parts or 1.5 parts by weight per 100 parts of the base rubber, and an upper limit of 2.5 parts or 3 parts or 5 parts or 6 parts or 10 parts or 15 parts by weight per 100 parts of the base rubber.

Coagents are commonly used with peroxides to increase the state of cure. Suitable coagents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the coagent is selected from zinc salts of acrylates, diacrylates, methacrylates, and dimethacrylates. In another particular embodiment, the coagent is zinc diacrylate. When the coagent is zinc diacrylate and/or zinc dimethacrylate, the coagent is typically included in the rubber composition in an amount within the range having a lower limit of 1 part or 5 parts or 10 parts by weight per 100 parts of the base rubber, and an upper limit of 19 parts or 20 parts or 25 parts or 30 parts or 35 parts or 40 parts or 45 parts or 50 parts or 60 parts by weight per 100 parts of the base rubber. When one or more less active coagents are used, such as zinc monomethacrylate and various liquid acrylates and methacrylates, the amount of less active coagent used may be the same as or higher than for zinc diacrylate and zinc dimethacrylate coagents.

Curing agents may also be used in compositions of the present invention. Curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

High energy radiation sources capable of generating free radicals include, but are not limited to, electron beams, ultraviolet radiation, gamma radiation, X-ray radiation, infrared radiation, heat, and combinations thereof.

Further examples of suitable free radical initiators, coagents, and curing agents are disclosed in U.S. Patent Application Publication Nos. 2004/0214661 and 2003/0144087 and U.S. Pat. Nos. 6,566,483, 6,695,718, and 6,939,907, the entire disclosures of which are hereby incorporated herein by reference.

Rubber compositions of the present invention comprise at least one free radical scavenger. In a preferred embodiment, the free radical scavenger is a benzoquinone compound. In a particularly preferred embodiment, the free radical scavenger is a benzoquinone compound selected from one or more compounds represented by the following formula, and hydrates thereof:

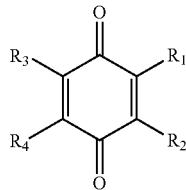

wherein each $R_1$, $R_2$, $R_3$, and $R_4$ is independently selected from the group consisting of hydrogen, a halogen group (F, Cl, Br, I), an alkyl group, a carboxyl group (—COOH) and metal salts thereof (e.g., —COO$^-$M$^+$) and esters thereof (—COOR), an acetate group (—CH$_2$COOH) and esters thereof (—CH$_2$COOR), a formyl group (—CHO), an acyl group (—COR), an acetyl group (—COCH$_3$), a halogenated carbonyl group (—COX), a sulfo group (—SO$_3$H) and esters thereof (—SO$_3$R), a halogenated sulfonyl group (—SO$_2$X), a sulfino group (—SO$_2$H), an alkylsulfinyl group (—SOR), a carbamoyl group (—CONH$_2$), a halogenated alkyl group, a cyano group (—CN), an alkoxy group (—OR), a hydroxy group (—OH) and metal salts thereof (e.g., —O$^-$M$^+$), an amino group (—NH$_2$), a nitro group (—NO$_2$), an aryl group (e.g., phenyl, tolyl, etc.), an aryloxy group (e.g., phenoxy, etc.), an arylalkyl group [e.g., cumyl (—C(CH$_3$)$_2$phenyl); benzyl (—CH$_2$phenyl)], a nitroso group (—NO), an acetamido group (—NHCOCH$_3$), and a vinyl group (—CH=CH$_2$).

In another particularly preferred embodiment, the free radical scavenger is a benzoquinone compound selected from one or more compounds represented by the following formula, and hydrates thereof:

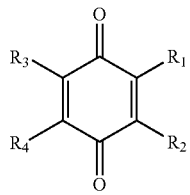

wherein each $R_1$, $R_2$, $R_3$, and $R_4$ is independently selected from the group consisting of: a metal salt of a carboxyl group (e.g., —COO$^-$M$^+$), an acetate group (—CH$_2$COOH) and esters thereof (—CH$_2$COOR), a hydroxy group (—OH), a metal salt of a hydroxy group (e.g., —O$^-$M$^+$), an amino group (—NH$_2$), a nitro group (—NO$_2$), an aryl group (e.g., phenyl, tolyl, etc.), an aryloxy group (e.g., phenoxy, etc.), an arylalkyl group [e.g., cumyl (—C(CH$_3$)$_2$phenyl); benzyl (—CH$_2$phenyl)], a nitroso group (—NO), an acetamido group (—NHCOCH$_3$), and a vinyl group (—CH=CH$_2$).

In another particularly preferred embodiment, the free radical scavenger is a benzoquinone selected from methyl p-benzoquinone and tetrachloro p-benzoquinone.

The free radical scavenger may be a combination of two or more benzoquinones, each of which is independently selected from compounds represented by one of the above formulas. The free radical scavenger may also be a combination of one or more benzoquinones and one or more non-benzoquinone free radical scavengers, including, but not limited to, hydroquinones, quinhydrones, catechols, and resorcinols.

The free radical scavenger is typically used in the form of a liquid or solid. In a particular embodiment, the free radical scavenger is used in a solid form and may be synthesized or processed so as to have a particle size of 0.25 mm or less, or 0.125 mm or less, or 0.09 mm or less. In another particular embodiment, the free radical scavenger is used in a solid form and melts at 150° F. or less, or 120° F. or less, or at a temperature that is the same as or less than the mixing temperature of the base rubber.

The free radical scavenger is present in the rubber composition in an amount of at least 0.1 parts by weight or at least 0.15 parts by weight or at least 0.2 parts by weight per 100 parts of the base rubber, or an amount within the range having a lower limit of 0.1 parts or 0.15 parts or 0.25 parts or 0.3 parts or 0.375 parts by weight per 100 parts of the base rubber, and an upper limit of 0.5 parts or 1 part or 1.5 parts or 2 parts or 3 parts by weight per 100 parts of the base rubber.

In a particular embodiment, a ratio ($P_{BQ}/P_{FRI}$) of the amount ($P_{BQ}$) of the benzoquinone present in the rubber composition, measured in parts by weight per 100 parts of the base rubber, to the amount ($P_{FRI}$) of free radical initiator present in the rubber composition, measured in parts by weight per 100 parts of the base rubber, is from 0.05 to 2. In another embodiment, $P_{BQ}/P_{FRI}$ is at least 0.05 and less than 0.5. In another embodiment, $P_{BQ}/P_{FRI}$ is at least 0.2 and less than 0.5. In another embodiment, $P_{BQ}/P_{FRI}$ is at least 0.25 and less than 0.5. In yet another embodiment, $P_{BQ}/P_{FRI}$ is within the range having a lower limit of 0.05 or 0.2 or 0.25 and an upper limit of 0.4 or 0.45 or 0.5 or 2.

Rubber compositions of the present invention optionally contain one or more antioxidants. Some antioxidants also act as free radical scavengers. Thus, when antioxidants are included in the rubber composition, the amount of free radical initiator used may be as high or higher than the amounts disclosed herein.

Rubber compositions of the present invention optionally contain one or more particulate fillers selected from inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. The amount of particulate material(s) present in rubber compositions of the present invention is typically within the range having a lower limit of 5 parts or 10 parts by weight per 100 parts of the base rubber, and an upper limit of 30 parts or 50 parts or 100 parts by weight per 100 parts of the base rubber.

Rubber compositions of the present invention optionally contain one or more additives selected from processing aids, processing oils, plasticizers, coloring agents, fluorescent agents, chemical blowing and foaming agents, defoaming agents, stabilizers, softening agents, impact modifiers, and the like. The amount of additive(s) typically present in rubber compositions of the present invention is typically within the range having a lower limit of 0 parts by weight per 100 parts of the base rubber and an upper limit of 20 parts or 50 parts or 100 parts or 150 parts by weight per 100 parts of the base rubber.

Filler materials may be dual-functional fillers, for example, zinc oxide (which may be used as a filler/acid scavenger) and titanium dioxide (which may be used as a filler/brightener material). Further examples of suitable fillers and additives include, but are not limited to, those disclosed in U.S. Patent Application Publication No. 2003/0225197, the entire disclosure of which is hereby incorporated herein by reference.

Rubber compositions of the present invention may have one or more of the following properties relative to previously known golf ball compositions: higher resilience, lower compression, increased resilience at equal compression, decreased compression at equal resilience, reduced crystallinity, increase in glass transition temperature, and an "S-shaped" shift in the rheometer curve.

In some embodiments, rubber compositions of the present invention have a combination of compression and COR values, as measured on golf ball cores formed from the rubber composition, previously achieved by adding organosulfur compounds to rubber compositions. In some embodiments, rubber compositions of the present invention have a combination of compression and COR values, as measured on golf ball cores formed from the rubber composition, superior to previously known compositions. Thus, rubber compositions of the present invention may contain one or more organosulfur compounds, but can have desirable compression and COR properties without them. Suitable organosulfur compounds are more fully disclosed, for example, in U.S. Pat. Nos. 6,635,716 and 6,919,393, the entire disclosures of which are hereby incorporated herein by reference. In a particular embodiment, the rubber composition is substantially free of organosulfur compounds. "Substantially free," as used herein, means that the rubber composition does not contain an organosulfur compound, or includes one or more organosulfur compounds in an amount of less than 0.01 parts by weight per 100 parts of the base rubber.

The present invention is not limited by any particular method for making the rubber composition.

Rubber compositions of the present invention can be used in a variety of applications. For example, rubber compositions of the present invention are suitable for use in golf equipment, including, but not limited to, golf balls, golf shoes, and golf clubs.

Golf Ball Applications

Golf balls of the present invention include one-piece, two-piece, multi-layer, and wound golf balls, having at least one layer which is formed from a rubber composition of the present invention. In golf balls having two or more layers which comprise a rubber composition of the present invention, the rubber composition of one layer may be the same or a different rubber composition as another layer. The layer(s) formed from the rubber composition of the present invention can be any one or more of a core layer, a cover layer, or an intermediate layer disposed between a core and a cover.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches. Dual and multilayer cores have an inner core layer and an outer core layer, and multilayer cores additionally have at least one intermediate core layer disposed between the inner core layer and the outer core layer. Inner core layers of the present invention preferably have a diameter within the range having a lower limit of 0.5 inches or 0.75 inches or 1 inch and an upper limit of 1.25 inches or 1.4 inches or 1.55 inches or 1.57 inches or 1.58 inches. Outer core layers of the present invention preferably have a thickness within the range having a lower limit of 0.02 inches or 0.025 inches or 0.032 inches and an upper limit of 0.31 inches or 0.44 inches or 0.56 inches. The total thickness of intermediate core layer(s) of the present invention is preferably within the range having a lower limit of 0.02 inches or 0.025 inches or 0.032 inches and an upper limit of 0.15 inches or 0.22 inches or 0.28 inches.

Golf ball cores of the present invention preferably have an Atti compression of 110 or less, or 90 or less, or 80 or less, or 75 or less, or 70 or less, or 65 or less, or 60 or less, or 50 or less. Compression is measured according to the procedure set forth below. Golf ball cores of the present invention preferably have a COR at 125 ft/s of at least 0.775, or at least 0.780, or at least 0.782, or at least 0.785, or at least 0.787, or at least 0.790, or at least 0.795, or at least 0.800. COR is determined according to the procedure set forth below. In a particular embodiment, the present invention provides a golf ball core having an Atti compression of 75 or less and a COR at 125 ft/s of at least 0.8. In another particular embodiment, the present invention provides a golf ball core having an Atti compression of 75 or less and a COR at 125 ft/s of at least 0.798. In another particular embodiment, the present invention provides a golf ball core having an Atti compression of 60 or less and a COR at 125 ft/s of at least 0.785. In another particular embodiment, the present invention provides a golf ball core having an Atti compression of 50 or less and a COR at 125 ft/s of at least 0.781, or at least 0.783, or at least 0.790.

Golf balls of the present invention preferably have at least one core layer formed from a rubber composition of the present invention. In a particular embodiment, the present invention provides a golf ball having a single layer core formed from a rubber composition of the present invention. In another particular embodiment, the present invention provides a golf ball comprising a dual core having an inner core layer and an outer core layer, wherein the inner core layer is formed from a rubber composition of the present invention. In another particular embodiment, the present invention provides a golf ball comprising a dual core having an inner core layer and an outer core layer, wherein the outer core layer is formed from a rubber composition of the present invention. In another particular embodiment, the present invention provides a golf ball comprising a multilayer core having an inner core layer, an outer core layer, and at least one intermediate core layer, wherein the inner core layer is formed from a rubber composition of the present invention. In another particular embodiment, the present invention provides a golf ball comprising a multilayer core having an inner core layer, an outer core layer, and at least one intermediate core layer, wherein the outer core layer is formed from a rubber composition of the present invention. In another particular embodiment, the present invention provides a golf ball comprising a multilayer core having an inner core layer, an outer core layer, and at least one intermediate core layer, wherein an intermediate core layer is formed from a rubber composition of the present invention.

In yet another particular embodiment, the present invention provides a wound golf ball comprising one or more core layers, an elastomeric winding around the core, and a cover, wherein a rubber composition of the present invention is present in at least one of the core layer(s) and/or the elastomeric winding around the core. Wound golf balls, including methods of their manufacture, are further disclosed, for example, in U.S. Pat. No. 4,846,910, the entire disclosure of which is hereby incorporated herein by reference.

Golf ball cores of the present invention may include one or more layers formed from a suitable material other than a rubber composition of the present invention. Suitable core materials for the golf balls disclosed herein include, but are not limited to, natural and synthetic rubbers, such as polybutadiene, polyisoprene, ethylene propylene rubber, ethylene propylene diene rubber, styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, and acrylonitrile chlorinated isoprene rubber; metallocene polymers; acid copolymers and ionomers; and combinations thereof.

Golf ball covers of the present invention include single, dual, and multilayer covers, and preferably have an overall thickness within the range having a lower limit of 0.01 inches or 0.02 inches or 0.025 inches or 0.03 inches or 0.04 inches or 0.045 inches or 0.05 inches or 0.06 inches and an upper limit of 0.07 inches or 0.075 inches or 0.08 inches or 0.09 inches or 0.1 inches or 0.15 inches or 0.2 inches or 0.3 inches or 0.5 inches. Dual and multilayer covers have an inner cover layer and an outer cover layer, and multilayer covers additionally have at least one intermediate cover layer disposed between the inner cover layer and the outer cover layer. Inner cover layers of the present invention preferably have a thickness within the range having a lower limit of 0.01 inches or 0.02 inches or 0.025 inches and an upper limit of 0.05 inches or 0.15 inches or 0.2 inches. Outer cover layers of the present invention preferably have a thickness of 0.01 inches or 0.02 inches or 0.025 inches and an upper limit of 0.05 inches or 0.15 inches or 0.2 inches. Intermediate cover layer(s) of the present invention preferably have a thickness of 0.01 inches or 0.02 inches or 0.025 inches and an upper limit of 0.05 inches or 0.15 inches or 0.2 inches.

Golf ball covers of the present invention may include one or more layers formed from a suitable material other than a rubber composition of the present invention. The cover material is preferably a tough, cut-resistant material, selected based on the desired performance characteristics. Suitable cover materials for the golf balls disclosed herein include, but are not limited to, polyethylene, including, for example, low density polyethylene, linear low density polyethylene, and high density polyethylene; polypropylene; rubber-toughened olefin polymers; acid copolymers which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked transpolyisoprene blends; polyurethanes; polyureas; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; ionomeric resins; and combinations thereof. Suitable cover materials and constructions also include, but are not limited to, those disclosed in U.S. Pat. Nos. 6,117,025, 6,767,940, and 6,960,630, the entire disclosures of which are hereby incorporated herein by reference.

Commercially available ionomeric cover materials include, but are not limited to, Surlyn® ionomer resins and DuPont® HPF 1000 and HPF 2000, commercially available from E. I. du Pont de Nemours and Company; and Iotek® ionomers, commercially available from ExxonMobil Chemical Company. Also suitable are blends of ionomers with thermoplastic elastomers. Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable polyurethane cover materials are further disclosed, for example, in U.S. Pat. No. 6,756,436, the entire disclosure of which is hereby incorporated herein by reference. When used as cover materials, polyurethane and polyurea can be thermoset or thermoplastic. Thermoset materials can be formed into golf ball layers by conventional casting or reaction injection molding techniques. Thermoplastic materials can be formed into golf ball layers by conventional compression or injection molding techniques. Light stable polyurethanes and polyureas are a preferred material for single layer covers and the outer cover layer of dual and multilayer covers. High modulus thermoplastics are a preferred material for the inner cover layer of dual and multilayer covers.

Golf ball cover materials optionally contain one or more filler(s), such as the fillers given above for rubber compositions of the present invention (e.g., titanium dioxide, barium sulfate, etc.), and/or additive(s), such as coloring agents, fluorescent agents, whitening agents, antioxidants, dispersants, UV absorbers, light stabilizers, plasticizers, surfactants, viscosity modifiers, compatibility agents, foaming agents, reinforcing agents, release agents, and the like.

Golf balls of the present invention optionally include one or more intermediate layer(s) disposed between the core and the cover. When present, the overall thickness of the intermediate layer(s) is generally within the range having a lower limit of 0.01 inches or 0.05 inches or 0.1 inches and an upper limit of 0.3 inches or 0.35 inches or 0.4 inches. Suitable intermediate layer materials include, but are not limited to, natural rubbers, balata, gutta-percha, cis-polybutadienes, trans-polybutadienes, synthetic polyisoprenes, polyoctenamers, styrene-propylene-diene rubbers, metallocene rubbers, styrene-butadiene rubbers, ethylene-propylenes, chloroprene rubbers, acrylonitrile rubbers, acrylonitrile-butadiene rubbers, styrene-ethylene block copolymers, maleic anhydride or succinate modified metallocene catalyzed ethylene copolymers, polypropylene resins, ionomer resins, polyamides, polyesters, polyurethanes, polyureas, chlorinated polyethylenes, polysulfide rubbers, fluorocarbons, and combinations thereof.

Suitable golf ball constructions and materials are further disclosed, for example, in U.S. Patent Application Publication Nos. 2003/0144087 and 2005/0164810, U.S. Pat. Nos. 5,688,119 and 5,919,100, and PCT Publications WO00/23519 and WO00/29129. The entire disclosure of each of these references is hereby incorporated herein by reference.

Golf balls of the present invention preferably have an overall diameter within the range having a lower limit of 1.6 or 1.62 or 1.66 inches and an upper limit of 1.69 or 1.74 or 1.800 inches. More preferably, golf balls of the present invention have an overall diameter of 1.68 inches. Golf balls of the present invention preferably have an Atti compression of 120 or less, or 110 or less, or 105 or less. Golf balls of the present invention preferably have a COR at 125 ft/s of at least 0.75, or at least 0.78, or at least 0.79.

The present invention is not limited by any particular process for forming the golf ball layer(s). It should be understood that the layer(s) can be formed by any suitable technique, including injection molding, compression molding, casting, and reaction injection molding.

EXAMPLES

It should be understood that the examples below are for illustrative purposes only. In no manner is the present invention limited to the specific disclosures therein.

Golf ball cores of the present invention were prepared by mixing materials according to the formulations given in the Tables below, and then molding and grinding the resulting compositions to obtain 1.55 inch diameter spheres. The compression and COR of each sphere was measured and compared to the compression and COR of comparative spheres to determine SFI. The results are given in the Tables below.

Compression, also referred to herein as "Atti compression," is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero Atti compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period proportional to the ball's incoming velocity. The ball impacts the steel plate and rebounds though the light screens, which again measure the time period required to transit between the light screens. This provides an outgoing transit time period proportional to the ball's outgoing velocity. COR is then calculated as the ratio of the outgoing transit time period to the incoming transit time period, $COR=T_{out}/T_{in}$.

SFI is determined by the following procedure. A control line is defined by the linear regression equation of COR vs. compression for two or more control formulations. The regression equation is used to calculate the COR of a theoretical control formulation at the same compression as an example formulation. SFI is then calculated as the COR of the example formulation minus the COR of the theoretical control formulation at the same compression as the example formulation. Thus, SFI is a positive number when the example formulation is more resilient than the control line at the same compression, and a negative number when the example formulation is less resilient than the control line at the same compression.

Examples 1-5

Methyl p-Benzoquinone as a Free Radical Scavenger

In Examples 1-5, rubber compositions of the present invention were prepared by mixing SE BR-1220, methyl p-benzoquinone, Perkadox® BC, SR526, zinc oxide, and barium sulfate, in a Brabender mixer for 5-10 minutes. Comparative compositions C1-C3 were similarly prepared, except that no benzoquinone was added. The relative amount of each component used is indicated in Table 1.

The rubber compositions of Examples 1-5 and C1-C3 were then cured in a compression molding press at 335° C. for 11 minutes to obtain spheres, which were subsequently ground to a diameter of 1.55 inches.

Each of the resulting spheres was evaluated for Atti compression and COR at 125 ft/sec. The SFI of each of Examples 1-5 was then determined by comparing the compression and COR of each Example with the compression and COR of C1-C3, according to the SFI procedure described above. The results for compression, COR, and SFI are reported in Table 1.

TABLE 1

| | Example No. | | | | | | | |
|---|---|---|---|---|---|---|---|---|
| | 1 | 2 | 3 | 4 | 5 | C1 | C2 | C3 |
| Composition | | | | | | | | |
| SE BR-1220* (parts by weight) | 100 | 100 | 100 | 100 | 100 | 100 | 100 | 100 |
| methyl p-benzoquinone (parts by weight) | 0.75 | 0.5 | 0.5 | 1 | 1 | 0 | 0 | 0 |
| Perkadox ® BC** (parts by weight) | 3 | 2 | 3 | 4 | 3 | 0.5 | 0.5 | 0.5 |
| SR526*** (parts by weight) | 25 | 25 | 25 | 25 | 25 | 20 | 25 | 30 |
| zinc oxide (parts by weight) | 5 | 5 | 5 | 5 | 5 | 5 | 5 | 5 |
| barium sulfate (parts by weight) | 17.5 | 17.3 | 17.4 | 17.7 | 17.5 | 19 | 17.4 | 15.7 |
| $P_{BQ}/P_{FRI}$ | 0.25 | 0.25 | 0.17 | 0.25 | 0.33 | $P_{BQ}=0$ | $P_{BQ}=0$ | $P_{BQ}=0$ |
| Core Properties | | | | | | | | |
| Compression | 39 | 40 | 48 | 36 | 26 | 34 | 61 | 81 |
| COR | 0.783 | 0.780 | 0.785 | 0.784 | 0.776 | 0.773 | 0.791 | 0.801 |
| SFI | 0.006 | 0.003 | 0.003 | 0.009 | 0.007 | — | — | — |

*SE BR-1220 is a high cis-1,4 polybutadiene commercially available from The Dow Chemical Company.
**Perkadox ® BC is a dicumyl peroxide free radical initiator commercially available from Akzo Nobel.
***SR526 is a zinc diacrylate-based coagent commercially available from Sartomer Company, Inc.

Example 6

Tetrachloro p-Benzoquinone as a Free Radical Scavenger

In Example 6, a rubber composition of the present invention was prepared by mixing SE BR-1220, tetrachloro p-benzoquinone, Perkadox® BC, SR526, zinc oxide, and barium sulfate, in a Brabender mixer for 5-10 minutes. Comparative compositions C4-C6 were similarly prepared, except that no benzoquinone was added. The relative amount of each component used is indicated in Table 2.

The rubber compositions of Examples 6 and C4-C6 were then cured in a compression molding press at 335° C. for 11 minutes to obtain spheres, which were subsequently ground to a diameter of 1.55 inches.

Each of the resulting spheres was evaluated for Atti compression and COR at 125 ft/sec. The SFI of Example 6 was then determined by comparing the compression and COR of Example 6 with the compression and COR of C4-C6, according to the SFI procedure described above. The results for compression, COR, and SFI are reported in Table 2.

TABLE 2

| | Example No. | | | |
|---|---|---|---|---|
| | 6 | C4 | C5 | C6 |
| Composition | | | | |
| SE BR-1220* (parts by weight) | 100 | 100 | 100 | 100 |
| tetrachloro p-benzoquinone (parts by weight) | 0.5 | 0 | 0 | 0 |
| Perkadox ® BC** (parts by weight) | 2 | 0.5 | 0.5 | 0.5 |
| SR526*** (parts by weight) | 25 | 20 | 25 | 30 |
| zinc oxide (parts by weight) | 5 | 5 | 5 | 5 |
| barium sulfate (parts by weight) | 17.3 | 19.0 | 17.3 | 15.7 |
| $P_{BQ}/P_{FRI}$ | 0.25 | $P_{BQ} = 0$ | $P_{BQ} = 0$ | $P_{BQ} = 0$ |
| Core Properties | | | | |
| Compression | 53 | 31 | 58 | 80 |
| COR | 0.790 | 0.770 | 0.786 | 0.797 |
| SFI | 0.008 | — | — | — |

*SE BR-1220 is a high cis-1,4 polybutadiene commercially available from The Dow Chemical Company.
**Perkadox ® BC is a dicumyl peroxide free radical initiator commercially available from Akzo Nobel.
***SR526 is a zinc diacrylate-based coagent commercially available from Sartomer Company, Inc.

All patents, publications, test procedures, and other references cited herein, including priority documents, are fully incorporated by reference to the extent such disclosure is not inconsistent with this invention.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a core and a cover, wherein the core has at least one layer formed from a rubber composition consisting of:
    (a) a base rubber;
    (b) at least 0.05 parts by weight of a free radical initiator per 100 parts of the base rubber;
    (c) at least 0.15 parts by weight of a benzoquinone per 100 parts of the base rubber;
    (d) a coagent selected from the group consisting of metal salts of acrylates, diacrylates, methacrylates, and dimethacrylates;
    (e) optionally one or more organosulfur compounds;
    (f) optionally one or more particulate fillers; and
    (g) optionally one or more processing aids;
    wherein a ratio ($P_{BQ}/P_{FRI}$) of the amount of the benzoquinone present in the rubber composition ($P_{BQ}$), measured in parts by weight per 100 parts of the base rubber, to the amount of free radical initiator present in the rubber composition ($P_{FRI}$), measured in parts by weight per 100 parts of the base rubber, is from 0.25 to 0.45; and
    wherein the core has a compression of 75 or less and a coefficient of restitution of at least 0.800.

2. The golf ball of claim 1, wherein the benzoquinone is selected from compounds represented by the following formula, and hydrates thereof:

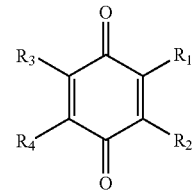

wherein each $R_1$, $R_2$, $R_3$, and $R_4$ is independently selected from the group consisting of hydrogen, a halogen group (F, Cl, Br, I), an alkyl group, a carboxyl group (—COOH) and metal salts thereof and esters thereof, an acetate group (—CH$_2$COOH) and esters thereof, a formyl group (—CHO), an acyl group, an acetyl group (—COCH$_3$), a halogenated carbonyl group, a sulfo group (—SO$_3$H) and esters thereof, a halogenated sulfonyl group, a sulfino group (—SO$_2$H), an alkylsulfinyl group, a carbamoyl group (—CONH$_2$), a halogenated alkyl group, a cyano group (—CN), an alkoxy group, a hydroxy group (—OH) and metal salts thereof, an amino group (—NH$_2$), a nitro group (—NO$_2$), an aryl group, an aryloxy group, an arylalkyl group, a nitroso group (—NO), an acetamido group (—NHCOCH$_3$), and a vinyl group (—CH═CH$_2$).

3. The golf ball of claim 1, wherein the benzoquinone is selected from methyl p-benzoquinone and tetrachloro p-benzoquinone.

4. The golf ball of claim 1, wherein the rubber composition is substantially free of organosulfur compounds.

5. The golf ball of claim 1, wherein the amount of the benzoquinone present in the rubber composition is at least 0.2 parts by weight per 100 parts of the base rubber.

6. The golf ball of claim 1, wherein the core is a single layer.

7. The golf ball of claim 1, wherein the core comprises an inner core layer and an outer core layer, and wherein the inner core layer is formed from the rubber composition.

8. The golf ball of claim 1, wherein the core comprises an inner core layer and an outer core layer, and wherein the outer core layer is formed from the rubber composition.

* * * * *